United States Patent
Kang

(10) Patent No.: US 11,127,985 B2
(45) Date of Patent: Sep. 21, 2021

(54) HIGH VOLTAGE BATTERY CELL

(71) Applicant: SK INNOVATION CO., LTD., Seoul (KR)

(72) Inventor: Hee Gyoung Kang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 16/444,815

(22) Filed: Jun. 18, 2019

(65) Prior Publication Data

US 2020/0014072 A1 Jan. 9, 2020

(30) Foreign Application Priority Data

Jul. 3, 2018 (KR) .................. 10-2018-0077235

(51) Int. Cl.
*H01M 10/0587* (2010.01)
*H01M 4/62* (2006.01)
*H01M 10/0525* (2010.01)
*H01M 4/587* (2010.01)
*H01M 4/48* (2010.01)
*H01M 4/38* (2006.01)
*H01M 4/485* (2010.01)
*H01M 50/538* (2021.01)

(52) U.S. Cl.
CPC ....... *H01M 10/0587* (2013.01); *H01M 4/386* (2013.01); *H01M 4/483* (2013.01); *H01M 4/485* (2013.01); *H01M 4/587* (2013.01); *H01M 4/623* (2013.01); *H01M 4/625* (2013.01); *H01M 10/0525* (2013.01); *H01M 50/538* (2021.01)

(58) Field of Classification Search
CPC ............. H01M 2/263; H01M 10/0587; H01M 10/0431; H01M 50/538
See application file for complete search history.

(56) References Cited

U.S. PATENT DOCUMENTS

| | | | | |
|---|---|---|---|---|
| 2011/0183169 A1* | 7/2011 | Bhardwaj | ......... | H01M 10/0431 429/94 |
| 2013/0149579 A1* | 6/2013 | Park | .................... | H01M 2/0217 429/94 |
| 2015/0072204 A1† | 3/2015 | Kwon | | |

FOREIGN PATENT DOCUMENTS

| | | |
|---|---|---|
| KR | 20090010444 A † | 1/2009 |
| KR | 10-1680755 | 11/2016 |
| KR | 10-1746127 | 6/2017 |
| KR | 10-1769820 | 8/2017 |
| KR | 10-2017-0104826 | 9/2017 |
| KR | 20180035119 A † | 4/2018 |

\* cited by examiner
† cited by third party

*Primary Examiner* — Ladan Mohaddes
(74) *Attorney, Agent, or Firm* — IP & T Group LLP

(57) ABSTRACT

The present invention provides a high voltage battery cell, and specifically a high voltage battery cell including a jelly roll in which three different types of jelly roll units are stacked freely and connected in series. According to embodiments of the present invention, there is provided a high voltage battery cell which is capable of implementing various cell structures while having a high voltage, and is relatively resistant to an external impact than other typical secondary cells.

10 Claims, 6 Drawing Sheets

HIGH VOLTAGE BATTERY CELL

CROSS-REFERENCE TO RELATED APPLICATION

This application claims priority to Korean Patent Applications No. 10-2018-0077235 filed on Jul. 3, 2018 in the Korean Intellectual Property Office (KIPO), the entire disclosure of which is incorporated by reference herein.

BACKGROUND OF THE INVENTION

1. Field of the Invention

The present invention relates to a nigh voltage battery cell.

2. Description of the Related Art

A secondary battery is used as a power source of a portable electronic device, and it is a recent trend to connect a plurality of secondary batteries in series or in parallel to each other, so as to be used for a hybrid vehicle, an electric vehicle or the like. In general, an electrode body including an anode, a cathode, and a separator is housed in a packing material, and an electrolyte is injected therein to form one battery cell. The electrode body may be referred to as a jelly roll, since it has a shape similar to jelly wound in a roll.

Even when connecting the battery cells are in series to each other, a voltage may be increased, but a large space may be required in preparation for the required voltage, or the voltage that can be formed may be limited according to a structural shape of the battery cells.

Therefore, studies have been made on a method of increasing the voltage of the battery cell itself and a method of ensuring stability of the battery cell having a high voltage.

As an example of the prior art, Korean Patent Registration No. 10-1680755, which is registered on Nov. 23, 2016, discloses a battery cell having improved insulation properties, however, still has lack of ensuring the stability of the battery cell.

SUMMARY OF THE INVENTION

It is an object of embodiments of the present invention to provide a high voltage battery cell in which jelly roll units are connected in series to have a high voltage.

In addition, another object of embodiments of the present invention is to provide a high voltage battery cell that may normally operate even if an external impact such as a deformation is applied thereto through a jelly roll unit including a solid electrolyte layer.

Further, another object of embodiments of the present invention is to provide a high voltage battery cell in which three different types of jelly roll units may be freely configured to vary a structure of the battery cell.

To achieve the above-described objects, according to an aspect of the present invention, there is provided a high voltage battery cell including: a jelly roll formed by stacking a plurality of jelly rolls including a cathode, a cathode tab protruding from the cathode, an anode, and an anode tab protruding from the anode, and connecting with each other in series, wherein each of the jelly roll units is any one of a first jelly roll unit in which the cathode tab and the anode tab protrude in the same direction, a second jelly roll unit in which the cathode tab and the anode tab protrude diagonally in different directions from each other, and a third jelly roll unit in which the cathode tab and the anode tab protrude in directions opposite to each other, wherein jelly roll units adjacent to each other are connected in series in the jelly roll units.

Herein, according to one embodiment of the present invention, the jelly roll unit may include a solid electrolyte layer.

Further, according to one embodiment of the present invention, one types of tide first jelly roll unit, the second jelly roll unit and the third jelly roll unit may be stacked and connected in series.

Further, according to one embodiment of the present invention, an odd number of the jelly roll units may be stacked and connected in series.

Further, according to one embodiment of the present invention, two of the first jelly roll unit, the second jelly roll unit and the third jelly roll unit may be stacked and connected in series.

Further, according to one embodiment of the present invention, all the first jelly roll unit, the second jelly roll unit, and the third jelly roll unit may be stacked and connected in series.

Further, according to one embodiment of the present invention, an outermost exposed surface of the jelly roll may be a metal exposed surface of the cathode or the anode in which only inside of the jelly roll is coated.

Further, according to one embodiment of the present invention, the anode may be coated with a first active material layer, and the first active material layer may include a lithium transition metal oxide, a PVdF binder, and a carbon conductive material.

Further, according to one embodiment of the present invention, an anode whose both surfaces are coated may be disposed at the outermost the jelly roll.

Furthermore, according to one embodiment of the present invention, the cathode may be coated with a second active material layer, and the second active material layer may include graphite, a carbon or silicon oxide, a silicon compound, or silicon metal, and further may include a styrene butadiene rubber binder, a ONE binder, and a carbon conductive material.

The high voltage battery cell according to the embodiments of the present invention may have a higher voltage than a typical secondary battery due to the jelly roll units connected in series.

In addition, the high voltage battery cell according to the embodiments of the present invention may include the solid electrolyte layer, thus to be resistant to an external impact applied thereto.

Further, in the high voltage battery cell according to the embodiments of the present invention, three types of jelly roll units may be freely arranged to vary the shape of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
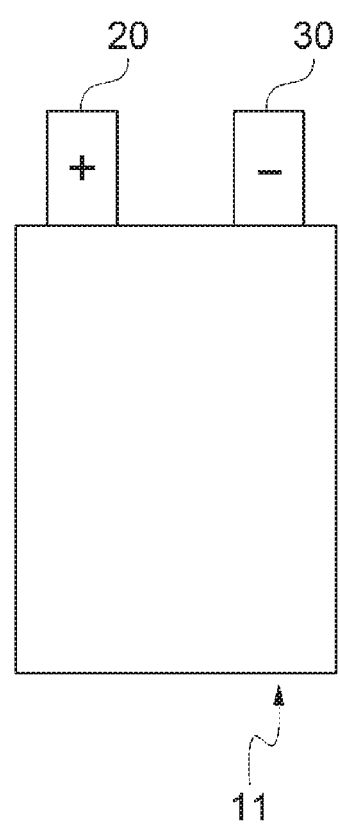
FIGS. 1A to 1C are schematic views illustrating jelly roll units of a high voltage battery cell according to an embodiment of the present invention.

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, it will be understood that, although the terms first, second, etc. may be used herein to describe various elements, components or sections, these elements, components or sections should not be limited by these terms. These terms are only used to distinguish one element, component or section from another element, component or section. Thus, a first element, component or section discussed below could be termed a second element, component or section without departing from the teaching, of the present invention.

Furthermore, directional terms such as "one side," "the other side," "upper," "lower," and the like are used in connection with the orientation of the disclosed drawings. Since the components of the embodiments of the present invention may be located in various orientations, the directional terms are used for illustrative purposes, and are not intended to limit the present invention thereto.

Figure 1B:
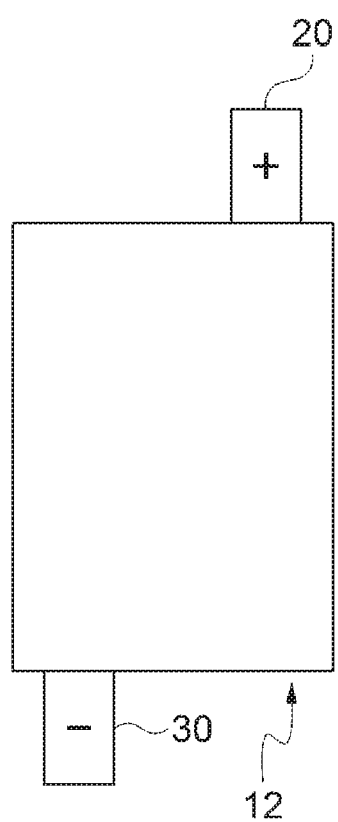
Figure 1C:
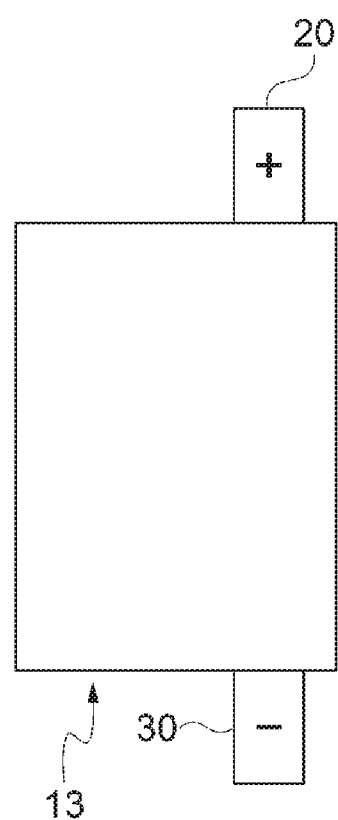

FIGS. 1A to 1C are schematic views illustrating jelly roll units of a high voltage battery cell according to an embodiment of the present invention. The high voltage battery cell according to the embodiment of the present invention may include a jelly roll 10. The jelly roll 10 corresponds to an electrode body or an electrode assembly of a secondary battery, and is used to refer to an electrode body or an electrode assembly having such a shape on which jelly is wound.

The jelly roll 10 may include a cathode, an anode, a cathode tab 20 protruding from the cathode, and an anode tab 30 protruding from the anode. Further, the jelly roll 10 may further include separate components within a range that is easy for those skilled in the art to understand.

In the jelly roll 10, a plurality of jelly roll units 11, 12 and 13 may be connected with each other to form one jelly roll. The jelly roll units 11, 12 and 13 may be divided into a D type, an X type, and an S type depending on the thereof.

For the convenience of description, the ID type roll unit may be referred to as a first roll unit 11, the X type jelly roll unit may be referred to as a second jelly roll unit 12, and the S type jelly roll unit may be referred to as a third jelly roll unit 13.

The first jelly roll unit may be referred as a type in which the cathode tab 20 and the anode tab 30 protrude in the same direction. Among jelly roll units in which the cathode tab 20 and the anode tab 30 protrude in different directions from each other, a case in which these taps protrude in directions opposite to each other may be referred to as a third jelly roll unit 13, and the other case may be referred to as a second jelly roll unit 12. That is, in the second jelly roll unit 12, these taps may protrude diagonally in different directions from each other.

A plurality of jelly roll units 12 and may stacked and connected in series to form a high voltage battery cell according to the embodiment of the present invention, which will be described below.

The high voltage battery cell according to the embodiment of the present invention may include a solid electrolyte layer present in a cell. When a liquid electrolyte is present in the cell, unexpected electrical communication may occur at portions other than the cathode tabs 20 and the anode tabs 30 of the jelly roll units 11, 12 and 13. Therefore, it is preferable that the electrolyte layer is formed in a form of an all solid-state battery in which no liquid electrolyte is present.

When forming the jelly roll 10, both sides exposed to an outside of the jelly roll units 11, 12 and 13 present at the outermost layer may be an uncoated electrode, that is, a metal exposed surface of the cathode or the anode in which one side, i.e., only inside of the jelly roll 10 is coated with an electrode active material layer. In addition, an anode whose both surfaces are coated may be disposed at the outermost the jelly roll.

As a major factor in designing the cell, there is a ratio of an electrochemical capacity between a cathode coated surface and an anode coated surface. If the capacity of the cathode per unit area exceeds that of the anode, precipitation of Li metal or a Li compound may irreversibly occur, which may lead to a deterioration of the cell such as a decrease in the capacity. When the outermost exposed surface is the cathode coated surface, a ratio of the cathode capacity in the whole cell is increased and the above-described deterioration of the cell may occur. Therefore, it is preferable to design the jelly roll of the cell for the lithium battery in such a way that the outermost exposed surface to be the anode coated surface or an uncoated cross-section.

The cathode may be coated with an active material to form a first active material layer. Herein, the first active material layer may include a lithium transition metal oxide such as a lithium cobalt oxide, lithium nickel oxide, lithium manganese oxide, lithium nickel cobalt manganese oxide, lithium nickel cobalt aluminum oxide, or the like as a major component, and may further include a PVdF binder and a carbon conductive material.

The anode may have a second active material layer formed thereon. The second active material layer may include graphite, a carbon or silicon oxide, a silicon compound, or silicon metal as the major component, and may further include a polymer styrene butadiene rubber binder and a carbon conductive material.

Figure 2:
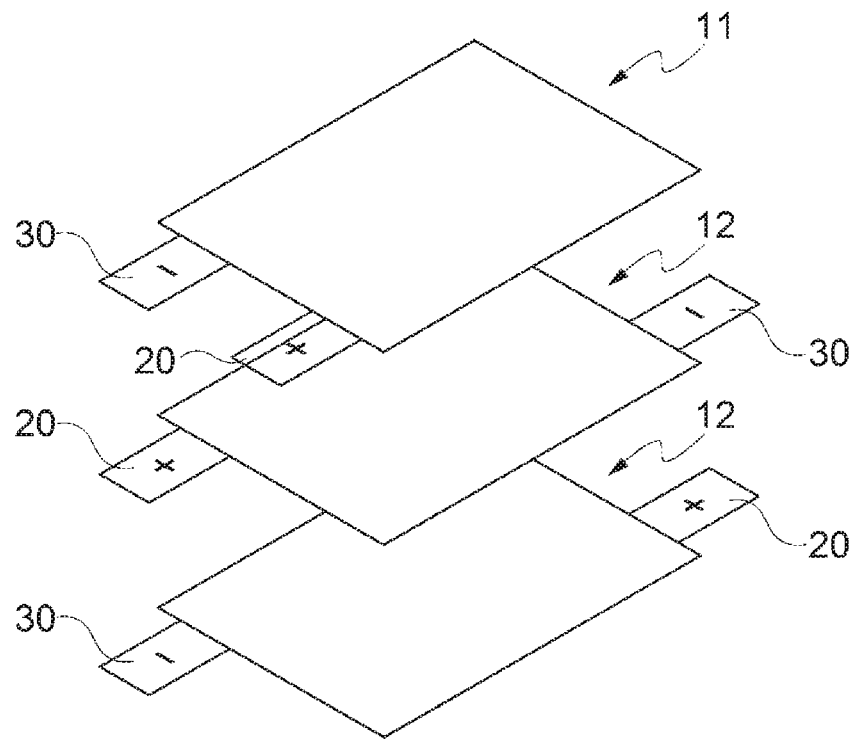
FIG. 2 is a schematic view illustrating a structure in which jelly roll units having different types of jelly rolls of the high voltage battery cell according to the embodiment of the present invention are stacked together.

FIG. 2 is a schematic view illustrating a structure in which jelly roll units having different types of jelly rolls of the high voltage battery cell according to the embodiment of the present invention are stacked together. Referring to FIG. 2, when forming the jelly roll 10, different types of jelly roll units may be connected in series, and the same type of jelly roll units may be connected.

FIG. 2 illustrates a method in which one first jelly roll unit 11 and two second jelly roll units 12 are connected to each other, but it is not limited thereto. Alternatively, all the first jelly roll unit 11, the second jelly roll unit 12 and the third jelly roll unit 13 may be used, and one or more respective jelly roll units 11, 12 and 13 may be connected in series. That is, if a voltage of each of the jelly roll units 11, 12 and 13 is 3.6V, a desired voltage of 7.2V, 10.8V, 14.4V or more may be formed depending, on the number of the connected jelly roll units 11, 12 and 13. The high voltage can mean a voltage in excess of 4.2V. The battery cell may be configured to have a voltage in excess of 4.2V by serially connecting the jellyroll unit.

Further, in addition to the case in which all the first to third jelly roll units 11, 12 and 13 are used, combinations of the first jelly roll unit 11 and the second jelly roll unit 12, the second jelly roll unit 12 and the third jelly roll unit 13, and the first jelly roll unit 11 and the third jelly roll unit 13 may be used. When using the combination of two or more types of jelly roll units, one or more respective jelly roll units 11, 12 and 13 may be arranged and connected in series.

When describing the configuration illustrated in FIG. 2 as an example, another second jelly roll unit 12 is stacked on one second jelly roll unit 12, and the first jelly roll unit 11 is again stacked thereon. At this time, if each of the jelly roll units 11 and 12 has a voltage of 3.6 V, the jelly roll 10 of FIG. 2 may have a voltage of 10.8V. At this time, if the cathode tab 20 of the first jelly roll unit 11 is drawn out to the outside, the anode tab 30 of the first jelly roll unit 11 and the cathode tab 20 of the second jelly roll unit 12 located below the first jelly roll unit 11 are connected in series, and the anode tab 30 of the second jelly roll unit 12 located in the middle and the cathode tab 20 of the second jelly roll unit 12 located in the lowest position may be connected in series. Thus, the anode tab 30 of the second jelly roll unit 12 located at the lowest position may be drawn out to the outside of the cell.

At this time, it may not be a problem that the cathode tab 20 to be drawn out to the outside and the anode tab 30 to be drawn out to the outside are drawn out in the same direction. However, when the cathode tab 20 and the anode tab 30 are drawn out in the same direction while being drawn out on the same vertical line, a problem such as a contact line may occur. Therefore, three types of jelly roll units 11, 12 and 13 may be stacked freely, but it is preferable to stack them so as to avoid a case in which they are drawn out in the same direction and on the same vertical line. That is, three different types of jelly roll units 11, 12 and 13 may be appropriately disposed, and various cell structures may be implemented according to a stacking order and a stacking method of the jelly roll units 11, 12 and 13.

Figure 3A:
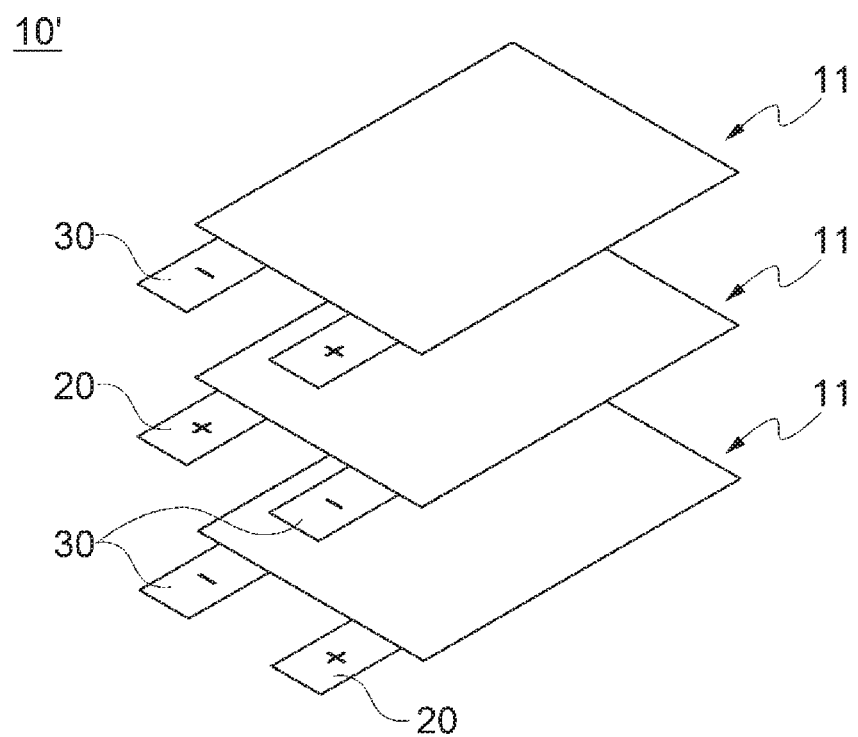
FIGS. 3A and 3D are schematic views illustrating structures in which jelly roll units having the same type of jelly rolls of the high voltage battery cell according to the embodiment of the present invention are stacked.
Figure 3B:
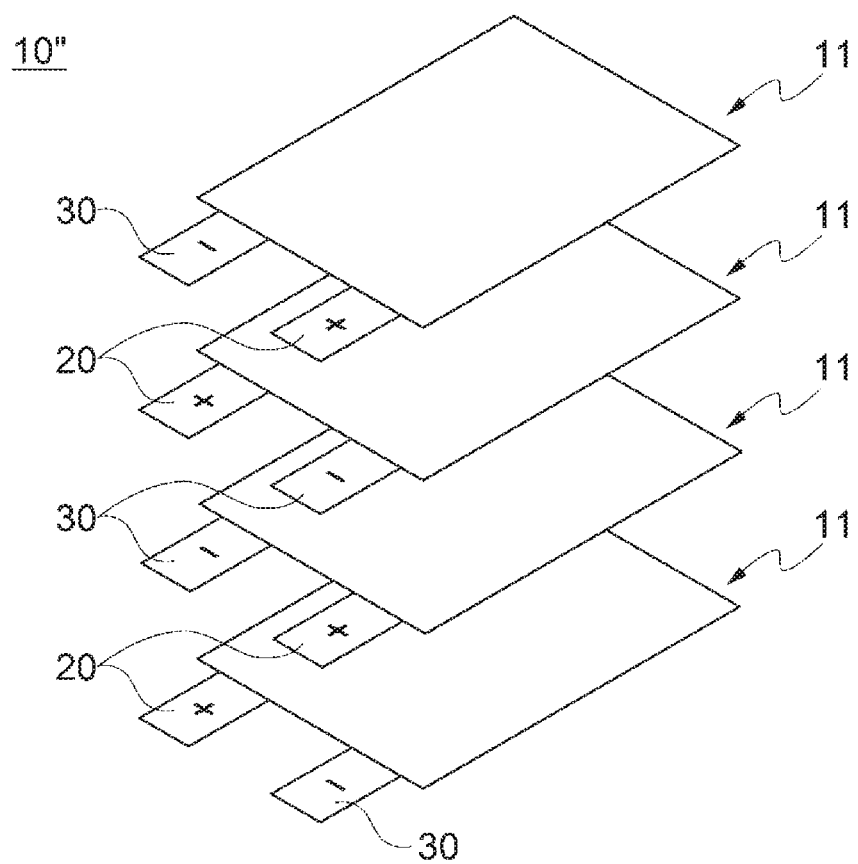

FIGS. 3A and 3B are schematic views illustrating structures in which jelly roll units having the same type of jelly rolls of the high voltage battery cell according to the embodiment of the present invention are stacked. Specifically, FIG. 3A is a view illustrating a structure in which an odd number of the same type of jelly roll units are stacked, and FIG. 3B is a view illustrating a structure in which an even number of the same type of jelly roll units are stacked.

Considering a case in which the same type of jelly roll units are stacked and connected in series, it may be considered by dividing into a case in which an odd number of the jelly roll units are stacked, and a case in which an even number of the jelly roll units are stacked.

In order to stack the same type of jelly roll units, each jelly roll unit may be stacked upside down for every time of stacking the jelly roll units. For example, as illustrated in FIG. 3A, the jelly roll units may be disposed so that anode tab 30 is disposed on a left side and the cathode tab 20 is disposed on a right side, then in the second layer, the jelly roll units may be stacked upside down so that the cathode tab 20 is disposed on the left side and the anode tab 30 disposed on the left side, and this process may be repeated several tens of times.

When an odd number of the same type of jelly roll units are stacked, the cathode tab 20 and the anode tab 30 drawn out to the outside of the battery cell may not be drawn on the same vertical line and in the same direction. However, when an even number of the same type of jelly roll units are stacked, the cathode tab 20 and the anode tab 30 may be drawn on the same vertical line and in the same direction, such that it may not be preferable.

FIG. 3A illustrates a jelly roll 10' having a structure in which three first jelly roll units 11 are stacked, and FIG. 3B illustrates a jelly roll 10" having a structure in which four first jelly roll units 11 are stacked.

For example, Referring to FIG. 3A, one first jelly roll unit 11 may be disposed at the bottom, another first jelly roll unit 11 may be disposed the middle, and another first jelly roll unit 11 may be disposed thereon. If the cathode tab 20 of the first jelly roll unit 11 disposed at the top may be connected to the outside, the anode tab 30 of the first jelly roll unit 11 disposed at the top is connected in series with the cathode tab 20 of the first jelly roll unit 11 disposed in the middle, and the anode tab 30 of the first jelly roll unit disposed in the middle is connected to the cathode tab 20 of the first jelly roll unit 11 disposed at the bottom, and the anode tab 30 of the first jelly roll unit 11 disposed at the bottom may be drawn out to the outside. At this time, the cathode tab 20 of the first jelly roll unit 11 and the anode tab 30 of the first jelly roll unit 11 disposed at the bottom are drawn out in the same direction, but are disposed at different positions from each other, such these tabs may be used as terminal tabs exposed to the outside of the battery cell.

On the other hand, referring to FIG. 3B, the first jelly roll units 11 forming the jelly roll 10" may be described while being referred to as first jelly roll units 11 which are disposed at the top, upper middle, lower middle, and bottom for the convenience of description. When the cathode tab 20 of the first jelly roll unit 11 disposed at the top is drawn out to the outside, the anode tab 30 of the first jelly roll unit 11 disposed at the top and the cathode tab 20 of the first jelly roll unit 11 disposed at the upper middle are connected in series, the anode tab 30 of the first jelly roll unit 11 disposed at the upper middle and the cathode tab 20 of the first jelly roll unit 11 disposed at the lower middle are connected in series, and the anode tab 30 of the first jelly roll unit 11 disposed at the lower middle and the cathode tab 20 of the first jelly roll unit 11 disposed at the bottom may be connected in series. Therefore, the anode tab 30 of the first jelly roll unit 11 disposed at the bottom may be drawn out to the outside. At this time, the cathode tab 20 and the anode tab 30 to be drawn out to the outside may be drawn out in the same direction and arranged on the same vertical line. In this case, an unexpected problem such as a contact line may occur as described above, which will be described in detail below.

The reason is that, FIGS. 2 and 3 are views created for the purpose of understanding the structure of the jelly roll 10 in a schematic and intuitive manner or for the convenience of description and comprehension, and therefore, actually, a distance between the first jelly roll unit 11 disposed at the top and the first jelly roll unit 11 disposed at the bottom may not be thick enough to cause the problem such as a contact line even if the cathode tab 20 and the anode tab 30 are slightly bent.

Therefore, when forming the jelly roll 10 using the same type of jelly roll units, it is preferable that an odd number of jelly rolls are stacked.

While the present invention has been particularly illustrated and described with reference to exemplary embodiments thereof, it is to be understood that the invention is not limited to the disclosed exemplary embodiments, but, on the contrary. Therefore, the scope of the present invention should not be limited to the above-described embodiments, but should be determined by equivalents to the appended claims, as well as the appended claims.

DESCRIPTION OF REFERENCE NUMERALS

10: Jelly roll
11: First jelly roll unit
22: Second jelly roll unit
13: Third jelly roll unit
20: Cathode tab
30: Anode tab

What is claimed is:

1. A battery cell comprising:
a jelly roll formed by stacking a plurality of jelly roll units including a cathode, a cathode tab protruding from the cathode, an anode, and an anode tab protruding from the anode, and connecting with each other in series, wherein each of the jelly roll units includes at least two of:
a first jelly roll unit in which the cathode tab and the anode tab protrude in the same direction from a first side;
a second jelly roll unit in which the cathode tab and the anode tab protrude diagonally in different directions from each other, wherein the cathode tab is on the first side and the anode tab is on a second side opposite to the first side; and
a third jelly roll unit in which the cathode tab and the anode tab protrude in directions opposite to each other on the first and the second side,
wherein jelly roll units adjacent to each other are connected in series.

2. The battery cell according to claim 1, wherein the jelly roll unit comprises a solid electrolyte layer.

3. The battery cell according to claim 1, wherein one types of the first jelly roll unit, the second jelly roll unit and the third jelly roll unit are stacked and connected in series.

4. The battery cell according to claim 3, wherein an odd number of the jelly roll units are stacked and connected in series.

5. The battery cell according to claim 1, wherein two of the first jelly roll unit, the second jelly roll unit and the third jelly roll unit are stacked and connected in series.

6. The battery cell according to claim 1, wherein all the first jelly roll unit, the second jelly roll unit, and the third jelly roll unit are stacked and connected in series.

7. The battery cell according to claim 1, wherein an outermost exposed surface of the jelly roll is a metal exposed surface of the cathode or the anode in which only inside of the jelly roll is coated.

8. The battery cell according to claim 7, wherein the anode is coated with a first active material layer, and
the first active material layer comprises a lithium transition metal oxide, a PVdF binder, and a carbon conductive material.

9. The battery cell according to claim 1, wherein an anode whose both surfaces are coated is disposed at the outermost the jelly roll.

10. The battery cell according to claim 9, wherein the cathode is coated with a second active material layer, and
the second active material layer comprises graphite, a carbon or silicon oxide, a silicon compound, or silicon metal, and further comprises a styrene butadiene rubber binder, a CMC binder, and a carbon conductive material.

* * * * *